Patented Jan. 7, 1941

2,227,559

UNITED STATES PATENT OFFICE 2,227,559

MANUFACTURE OF HIGH OCTANE GASOLINE

Donald R. Stevens, Swissvale, and Joseph B. McKinley, Pittsburgh, Pa., assignors to Gulf Research & Development Company, Pittsburgh, Pa., a corporation of Delaware No Drawing. Application February 26, 1940, Serial No. 320,971

6 Claims. (Cl. 196—10)

This invention relates to the manufacture of high octane gasoline; and it is particularly concerned with an improvement in the method of producing high octane gasoline by alkylating an iso-paraffin with an olefin in contact with concentrated sulfuric acid, said improvement comprising effecting such contact in the presence of nickel; and it also includes as a catalyst for alkylating iso-paraffins with olefins, concentrated sulfuric acid containing nickel sulfate; all as more fully hereinafter set forth and as claimed.

In the production of high grade gasoline, particularly for use in aviation motors or for blending with lower grades of gasoline to produce aviation grade gasoline, it is desirable that a gasoline having as high an octane number and as low a degree of unsaturation as possible be obtained. The high octane number is the mark of a more efficient fuel while a highly saturated fuel exhibits less tendency to deteriorate on ageing and exposure.

A recent development in the art of producing high octane gasoline substantially free from unsaturated hydrocarbons, suitable for aviation purposes, is the discovery that the lower iso-paraffins, for example, iso-butane and iso-pentane, can be combined with olefins, such as propylenes and butenes in the presence of a concentrated sulfuric acid catalyst to produce a hydrocarbon material which boils in the gasoline range, has a high octane number, and is almost completely saturated. The type of reaction involved is illustrated by the union of iso-butane with a butene which may be represented by the following equation:

$$C_4H_{10} + C_4H_8 \rightarrow C_8H_{18}$$

wherein $C_4H_{10}$ represents iso-butane and $C_4H_8$ represents any one or a mixture of the three isomeric butenes (butene-1, butene-2 and iso-butylene). The primary product of this reaction is an iso-octane, but as the result of secondary reactions involving cracking and re-alkylation, the final product consists of a mixture of saturated hydrocarbons comprising octanes and lower and higher hydrocarbons boiling within the gasoline range.

This type of process is known in the art as an "alkylation" process, since the primary reaction is the alkylation of an iso-parafin with an olefin. This term is generally interpreted to include also the various secondary reactions which result in forming the final complex mixture. It is in this sense that the alkylation process is referred to in this specification and the appended claims.

The above reaction is merely illustrative of a general type of alkylation reaction which can be effected between various olefins and various iso-paraffins in the presence of concentrated sulfuric acid. Normal paraffins are not reactive although, under conditions such that they are isomerized, for example, when an aluminum halide is employed as the alkylation catalyst, they may undergo isomerization to iso-paraffins and then react with the olefin. Ethylene is more difficult to combine with iso-paraffins than are higher olefins such as propylene and the butenes and, in general, it cannot be induced to react with iso-paraffins by means of sulfuric acid. However, numerous other olefins do react with iso-paraffins in the presence of sulfuric acid in the manner indicated above, and in general the products of reaction are high octane, highly saturated hydrocarbon materials suitable as aviation gasoline.

Olefins, however, also tend to polymerize in the presence of sulfuric acid forming dimers, trimers and possibly even higher polymers. These polymers are unsaturated and boil above the desired gasoline range. Since the primary object of the alkylation reaction is to produce a high yield of gasoline which is highly saturated, the tendency of olefins to polymerize should be avoided. Moreover, an alkylation product containing substantial amounts of these unsaturated polymers has a lower octane number than a saturated product, thus constituting a further reason for avoiding polymerization.

It has been found that the concentration of the sulfuric acid used as an alkylation catalyst is an important factor in obtaining a high yield of high octane, saturated gasoline. Concentrated sulfuric acid is necessary to successful operation of the alkylation process. Thus, when iso-butane is alkylated with one of the butenes, or with a mixture of butenes such as the $C_4$ cut of cracking gas, best results are obtained by using 94 to 97 per cent sulfuric acid as the catalyst. However, if the alkylation reaction is continued without replacing the catalyst, it becomes increasingly diluted by certain products of reaction, apparently sulfuric esters which are soluble in sulfuric acid, and the effectiveness of the acid decreases until finally it is no longer capable of producing an economical yield of the desired products. In general, it is not desirable to employ a sulfuric acid catalyst after its apparent concentration has been reduced to below about 85 per cent and concentrations above 90 per cent are most desirable. (By "apparent concentration" is meant the concentration arrived at by titrating a given weight of acid and calculating all the titratable acid as $H_2SO_4$. Thus it may include sulfuric acid esters.)

A further factor in successful operation of the alkylation process is the ratio of sulfuric acid to hydrocarbon reactants. It has been found that it is advantageous to employ a large amount of sulfuric acid in this process. Thus in the alkylation of iso-butane by means of one or more of the butenes, wherein the hydrocarbon reactants are maintained in the liquid state, the employment of not less than about one volume of concentrated sulfuric acid per volume of liquefied reactants results in considerably higher yields of saturated gasoline having a high octane number than when substantially lower sulfuric acid : reactant ratios are employed.

Other factors of importance in the alkylation of iso-paraffins with olefins include the iso-paraffin:olefin ratio and the temperature. Thus it has been found that a high ratio of iso-paraffin to olefin, advantageously from 2 to 10 parts by volume of iso-paraffin per volume of olefin, produces better results than lower ratios. When lower ratios are employed, there is a greater tendency for polymerization to occur. It has also been found that, in general, temperatures between about $-10°$ and $+30°$ C. are optimum. If lower temperatures are employed, polymerization is favored, whereas if higher temperatures are employed fouling of the catalyst and oxidation tend to occur.

Since, in the successful operation of the alkylation process of producing high octane gasoline from iso-paraffins a large proportion of concentrated sulfuric acid catalyst is used, and since this catalyst is diluted by the products of reaction and thereby has its catalytic activity destroyed, it is highly important to effect an economy in the consumption of sulfuric acid by such alkylation process. In fact, the major problem in making this process commercially feasible for the production of high octane gasoline is the reduction of sulfuric acid consumption.

It is an object achieved by the present invention to effect a considerable economy in the consumption of sulfuric acid in the production of high octane gasoline by the alkylation of iso-paraffin with olefins.

We have found that the effective catalytic life of sulfuric acid in the process of alkylating iso-paraffins with olefins for the production of high octane gasoline substantially free from unsaturated hydrocarbons, can be considerably increased by carrying out the alkylation process in the presence of nickel, particularly by incorporating nickel or a nickel salt in the concentrated sulfuric acid catalyst. By the use of a catalyst consisting of sulfuric acid of at least 85 per cent concentration and advantageously a 90 to 97 per cent sulfuric acid containing nickel, in the form of nickel sulfate in amounts up to the saturation solubility at room temperature, and carrying out the alkylation of an iso-paraffin with an olefin according to the customary methods heretofore known, we have been able to effect substantial reductions in the sulfuric acid consumption and have been able to obtain 25 to 30 per cent greater yields of high octane saturated gasoline per unit of sulfuric acid used up.

The alkylation process may be carried out in the presence of nickel according to our invention in various ways. It may, for example, be carried out in nickel lined vessels or in the presence of strip or powdered nickel or the like. In such case nickel is incorporated in the sulfuric acid catalyst in the form of nickel sulfate. In general however we have found it more advantageous to incorporate nickel sulfate in the sulfuric acid either by the addition of nickel sulfate itself, or a compound of nickel which will react with the sulfuric acid to form nickel sulfate in solution, such as nickel chloride, nickel nitrate, nickel carbonate and nickel acetate.

The amount of nickel necessary to be present in the sulfuric acid for the purpose of our invention is very small. The alkylation process is customarily carried out at room temperature. At this temperature only about 0.116 per cent of nickel sulfate is soluble in concentrated sulfuric acid. However even the small amount of nickel present in concentrated sulfuric acid substantially saturated with nickel sulfate is sufficient to effect a very substantial reduction in sulfuric acid consumption. Somewhat greater percentages of nickel may be present if desired but we have usually found their use unnecessary. Lesser amounts of nickel give somewhat lessened effects and we have generally found it most advantageous to use sulfuric acid substantially saturated with nickel sulfate.

The nickel sulfate has no deleterious effect on the alkylation reaction and the alkylation of substantially any of the usual iso-paraffins with any of the usual olefins for the production of saturated high octane gasoline may be carried out in the presence of nickel with advantage. The following comparative examples illustrate specifically the advantages of effecting alkylation of isobutane with propylene in the presence of nickel.

*Example 1.*—1196 parts by weight of 93.6 per cent sulfuric acid were introduced into a lead lined autoclave provided with a mechanical stirrer. The autoclave was closed and 100 parts by weight each of gaseous iso-butane and propylene were introduced. Agitation was immediately begun and the reaction temperature was maintained at 20° C. by means of an ice bath. The reaction was allowed to proceed under these conditions for two hours, at the end of which time unreacted gas was vented and the liquid was carefully and completely separated into sulfuric acid and hydrocarbon layers. By means of this procedure, 153.2 parts of liquid hydrocarbon were produced, nearly all of which boiled below 185° C. The fraction boiling below 185° C. was substantially completely saturated, having a bromine number of less than 1.0, and constituted a high grade aviation type of gasoline. However, the concentration of the sulfuric acid catalyst was reduced from 93.6 to 91.8 per cent or a difference of 1.8 per cent. While a 91.8 per cent sulfuric acid catalyst is still effective for alkylation purposes, this rate of dilution will rapidly reduce the acid concentration below the desired level.

A similar operation was conducted except that the sulfuric acid catalyst was saturated at 20° C. with nickel sulfate. A slightly lower yield of liquid hydrocarbon was produced (142 parts instead of 153.2). The product was completely saturated, having a bromine number of less than 1.0, and constituted a good grade of aviation gasoline. A marked improvement in the condition of the used sulfuric acid catalyst resulted. The concentration of the acid was reduced from the initial value of 93.6 per cent to a final value of 92.3 per cent or a diminution of only 1.3 per cent as compared to 1.8 per cent in the absence of nickel sulfate.

From an economic standpoint the criterion of catalyst economy is the amount of desired product capable of being produced by a given quantity of catalyst, and a suitable measure of the efficiency of the process is the amount of liquid hydrocarbon produced per unit decrease in concentration of the sulfuric acid. On this basis of comparison the results obtained with and without nickel sulfate were as follows:

|  | Parts |
|---|---|
| Without NiSO₄ | 85.2 |
| With NiSO₄ | 109.2 |

The percentage improvement in this factor effected by employment of nickel sulfate was 28.2 per cent. That is to say, between one-fourth and one-third more gasoline of aviation grade can be produced from iso-butane and propylene by using sulfuric acid saturated with nickel sulfate than can be produced with the same amount of acid in the absence of nickel sulfate.

*Example 2.*—Batches were run to determine the effectiveness of nickel sulfate when the sulfuric acid catalyst was used repeatedly. Two equal batches of 1196 parts of sulfuric acid were used, each having an initial concentration of 93.6 per cent. One batch contained no added material while the other was saturated at 20° C. with nickel sulfate. Each batch of sulfuric acid was used in the alkylation of three successive batches of iso-butane and propylene. Equimolar quantities of iso-butane and propylene were used each time; 138 parts and 100 parts, respectively. Otherwise the conditions of operation were identical with those in Example 1. In each case the liquid hydrocarbon product was a substantially completely saturated, high octane material having a bromine number of less than 1.0, nearly all of which boiled in the gasoline range. The quantitative results were as follows:

|  | $H_2SO_4$ | $H_2SO_4 + 0.116\%$ $NiSO_4$ |
|---|---|---|
| Total liquid hydrocarbon produced parts | 521.2 | 510.3 |
| Total change in acid concentration per cent | 4.9 | 3.8 |
| Liquid hydrocarbon produced per unit change in acid concentration | 106 | 134 |

Increment of yield per unit decrease of acidity effected by nickel sulfate = 26.4 per cent.

Thus it is evident that more than one-fourth more gasoline can be produced in the presence of nickel sulfate than when it is absent.

*Example 3.*—In the above examples a large quantity of acid relative to the quantity of reactants was used. This represents present preferred practice. However, acid deterioration is greater when smaller quantities of acid are used. Under such conditions the effectiveness of nickel in conserving the acid is more pronounced as shown by this example in which the results obtained with half the amount of sulfuric acid employed in Examples 1 and 2 are set forth.

Two batches were run, each comprising 100 parts of propylene and 138 parts of iso-butane. One batch also contained 598 parts of 94.4 per cent sulfuric acid but no nickel sulfate, whereas the other batch contained 598 parts of 93.6 per cent sulfuric acid which had been saturated at 20° C. with nickel sulfate. Otherwise the operations were the same as in Example 1.

Under these conditions, when no nickel sulfate was used, only 46.9 parts of liquid hydrocarbon was produced. The acid concentration decreased from the initial value of 94.4 per cent to a final value of 76.6 per cent, or a decrease of 17.8 per cent. The production of the desired type of product was low, being only 2.64 parts per unit decrease in acid concentration.

When the same quantity of 93.6 per cent sulfuric acid saturated with nickel sulfate at 20° C. was employed, 60.8 parts of liquid hydrocarbon were produced, an increase of 30 per cent over that produced in the absence of nickel sulfate. The acid concentration decreased from 93.6 per cent to 82.4 per cent, a decrease of 11.2 per cent. The yield of liquid hydrocarbon per unit decrease in acid concentration was 5.43 parts, which is low compared to results obtained with twice the amount of sulfuric acid, but nevertheless represents an increase of 105.7 per cent over the yield using the same sulfuric acid : reactant ratio in the absence of nickel sulfate.

From these results, it is apparent that the effect of using nickel sulfate is to increase the effective life and hence decrease the rate of consumption of sulfuric acid catalyst. Also, it makes possible the employment of a smaller ratio of sulfuric acid to reactants, thereby making possible a substantial reduction in the size of reactors and handling equipment and generally facilitating operation of the process.

While our invention has been described with particular reference to certain embodiments, it is not restricted in its application to such embodiments except as hereinafter defined in the claims.

What we claim is:

1. An improved process of alkylating iso-paraffins with olefins for the production of high octane gasoline substantially free from unsaturated hydrocarbons, which comprises contacting a mixture of an iso-paraffin and an olefin with concentrated sulfuric acid in the presence of nickel.

2. An improved process of alkylating iso-paraffins with olefins for the production of high octane gasoline substantially free from unsaturated hydrocarbons, which comprises contacting a mixture of an iso-paraffin and an olefin with concentrated sulfuric acid containing nickel sulfate.

3. An improvement in the production of high octane gasoline substantially free from unsaturated hydrocarbons by alkylating iso-paraffins with olefins in contact with concentrated sulfuric acid, which comprises effecting such contact in the presence of nickel.

4. An improvement in the production of high octane gasoline substantially free from unsaturated hydrocarbons by alkylating iso-paraffins with olefins in contact with concentrated sulfuric acid, which comprises incorporating a small amount of nickel in the sulfuric acid catalyst.

5. An improvement in the production of high octane gasoline substantially free from unsaturated hydrocarbons by alkylating iso-butane with propylene in contact with concentrated sulfuric acid, which comprises effecting such contact in the presence of nickel sulfate.

6. A catalyst for alkylating iso-paraffins with olefins for the production of high octane gasoline substantially free from unsaturated hydrocarbons, which comprises concentrated sulfuric acid containing nickel sulfate.

DONALD R. STEVENS.
JOSEPH B. McKINLEY.